(12) United States Patent
Weyerhaeuser et al.

(10) Patent No.: US 9,311,356 B2
(45) Date of Patent: *Apr. 12, 2016

(54) DATABASE CALCULATION ENGINE

(75) Inventors: Christoph Weyerhaeuser, Heidelberg (DE); Daniel Baeumges, Viersen (DE); Tobias Mindnich, Walldorf (DE); Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 67 days.

This patent is subject to a terminal disclaimer.

(21) Appl. No.: 13/463,698

(22) Filed: May 3, 2012

(65) Prior Publication Data
US 2012/0221549 A1      Aug. 30, 2012

Related U.S. Application Data

(63) Continuation of application No. 12/914,445, filed on Oct. 28, 2010, now Pat. No. 8,195,643.

(51) Int. Cl.
   *G06F 17/30*     (2006.01)
   *G06F 7/00*      (2006.01)
(52) U.S. Cl.
   CPC ............................. *G06F 17/30463* (2013.01)
(58) Field of Classification Search
   CPC ............................................... G06F 17/30392
   USPC ....................................................... 707/713
   See application file for complete search history.

(56) References Cited

U.S. PATENT DOCUMENTS

| | | | | |
|---|---|---|---|---|
| 5,870,759 A | * | 2/1999 | Bauer | G06F 17/30578 707/999.004 |
| 6,330,286 B1 | * | 12/2001 | Lyons | H04N 21/23406 375/240.26 |
| 6,609,123 B1 | * | 8/2003 | Cazemier et al. | |
| 6,842,906 B1 | * | 1/2005 | Bowman-Amuah | 719/330 |
| 8,538,916 B1 | * | 9/2013 | Alfonseca | G06F 17/30734 707/603 |
| 8,983,898 B1 | * | 3/2015 | Alfonseca | G06F 17/30707 707/603 |
| 9,092,579 B1 | * | 7/2015 | Cohen | G06F 11/3688 |
| 9,104,815 B1 | * | 8/2015 | Cohen | G06F 11/3692 |
| 2003/0120567 A1 | * | 6/2003 | Macklin | 705/35 |
| 2006/0106656 A1 | * | 5/2006 | Ouimet | 705/7 |
| 2011/0035803 A1 | * | 2/2011 | Lucangeli Obes | G06F 21/577 726/25 |
| 2011/0074670 A1 | * | 3/2011 | Teegan et al. | 345/156 |
| 2012/0162265 A1 | * | 6/2012 | Heinrich et al. | 345/661 |

\* cited by examiner

*Primary Examiner* — Pavan Mamillapalli
(74) *Attorney, Agent, or Firm* — Mintz Levin Cohn Ferris Glovsky and Popeo, P.C.

(57) ABSTRACT

A select query or a data referencing a calculation scenario is received by a database server from a remote application server. The specified calculation scenario is one of a plurality of calculation scenarios and it defines a data flow model that includes one or more calculation nodes. Each calculation node defines one or more operations to execute on the database server. Thereafter, the database server instantiates the specified calculation scenario and executes the operations defined by the calculation nodes of the instantiated calculation scenario to result in a responsive data set. This data set is then provided by the database server to the application server. Related apparatus, systems, techniques and articles are also described.

19 Claims, 7 Drawing Sheets

DATABASE CALCULATION ENGINE

CROSS REFERENCE TO RELATED APPLICATION

This application is a Continuation of patent application Ser. No. 12/914,445, filed on Oct. 28, 2010, entitled "Database Calculation Engine", the contents of which are hereby fully incorporated by reference.

TECHNICAL FIELD

The subject matter described herein relates to a database calculation engine and the use of calculation scenarios to execute database queries.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data.

SUMMARY

In one aspect, a calculation scenario or a reference to a calculation scenario is received by a database server from a remote application server. The specified calculation scenario is one of a plurality of calculation scenarios and it defines a data flow model that includes one or more calculation nodes. Each calculation node defines one or more operations to execute on the database server. Thereafter, the database server instantiates the specified calculation scenario and executes the operations defined by the calculation nodes of the instantiated calculation scenario to result in a responsive data set. This data set is then provided by the database server to the application server.

In some implementations, at least a portion of paths and/or attributes defined by the calculation scenario are not required to respond to the query. In such cases, the instantiated calculation scenario omits the paths and attributes defined by the calculation scenario that are not required to respond to the query. In other cases, the entire calculation scenario is utilized and no paths or attributes are removed.

At least one of the calculation nodes can filter and/or sort results obtained from the database server prior to transmission of the result set. The calculation scenario can be instantiated in a calculation engine layer by a calculation engine. The calculation engine layer can interact with a physical table pool and a logical layer. The physical table pool can comprise physical tables containing data to be queried and the logical layer can define a logical metamodel joining at least a portion of the physical tables in the physical table pool. An input for each calculation node can comprise one or more of: a physical index, a logical index (e.g., join index, OLAP index, etc.), and another calculation node. Each calculation node can have at least one output table that is used to generate the final result set. At least one calculation node can consume an output table of another calculation node.

The executing can comprise forwarding the query to a calculation node in the calculation scenario that is identified as a default node if the query does not specify a calculation node at which the query should be executed. In other cases, the query identifies a particular calculation node and the query is forwarded to such node for execution.

The calculation scenario can comprises database metadata. The calculation scenario can be exposed as a database calculation view. The executing can comprise invoking, by a SQL processor, a calculation engine to execute the calculation scenario behind the database calculation view. The calculation engine can invoke the SQL processor for executing set operations and SQL nodes and on the other hand the SQL processor invokes the calculation engine when executing SQL queries with calculation views.

Articles of manufacture are also described that comprise computer executable instructions permanently stored on computer readable media (e.g., non-transitory media, etc.), which, when executed by a computer, causes the computer to perform operations herein. Similarly, computer systems are also described that may include at least one processor and a memory coupled to the processor. The memory may temporarily or permanently store one or more programs that cause the processor to perform one or more of the operations described herein. For example, a system can include a database server and an application server (with each having at least one corresponding computer system including at least one processor and memory).

The subject matter described herein provides many advantages. For example, in a combined environment with a database server and an application server, at execution time of a query, there can be several roundtrips of data between such servers. The current subject matter, by providing intermediate results at the database server, greatly reduces the amount of data transported to the application server.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
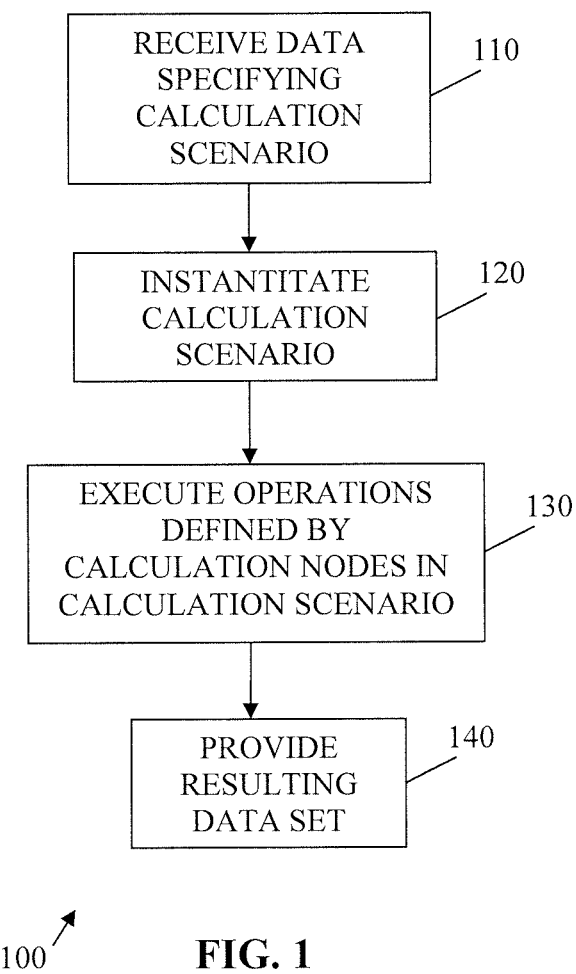
FIG. 1 is a process flow diagram illustrating a method of querying a database using a calculation scenario.

FIG. 1 is a process flow diagram 100 illustrating a method in which, at 110, a calculation scenario or a reference to a calculation scenario (e.g., a select query referencing the calculation scenario, etc.) is received by a database server from a remote application server. The specified calculation scenario is one of a plurality of calculation scenarios and it defines a data flow model that includes one or more calculation nodes. Each calculation node defines one or more operations to execute on the database server. Thereafter, at 120, the database server instantiates the specified calculation scenario and, at 130, executes the operations defined by the calculation nodes of the instantiated calculation scenario to result in a responsive data set. This data set is then provided, at 140, by the database server to the application server.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

During query time (i.e., the time in which a database is queried), the data flow specified by a calculation scenario is instantiated. During instantiation, the calculation scenario is compacted to only include queries requirements by removing useless pathes and attributes (that are not requested) within the calculation scenario. This compaction reduces calculation time and also minimizes the total amount of data that must be processed.

Figure 2:
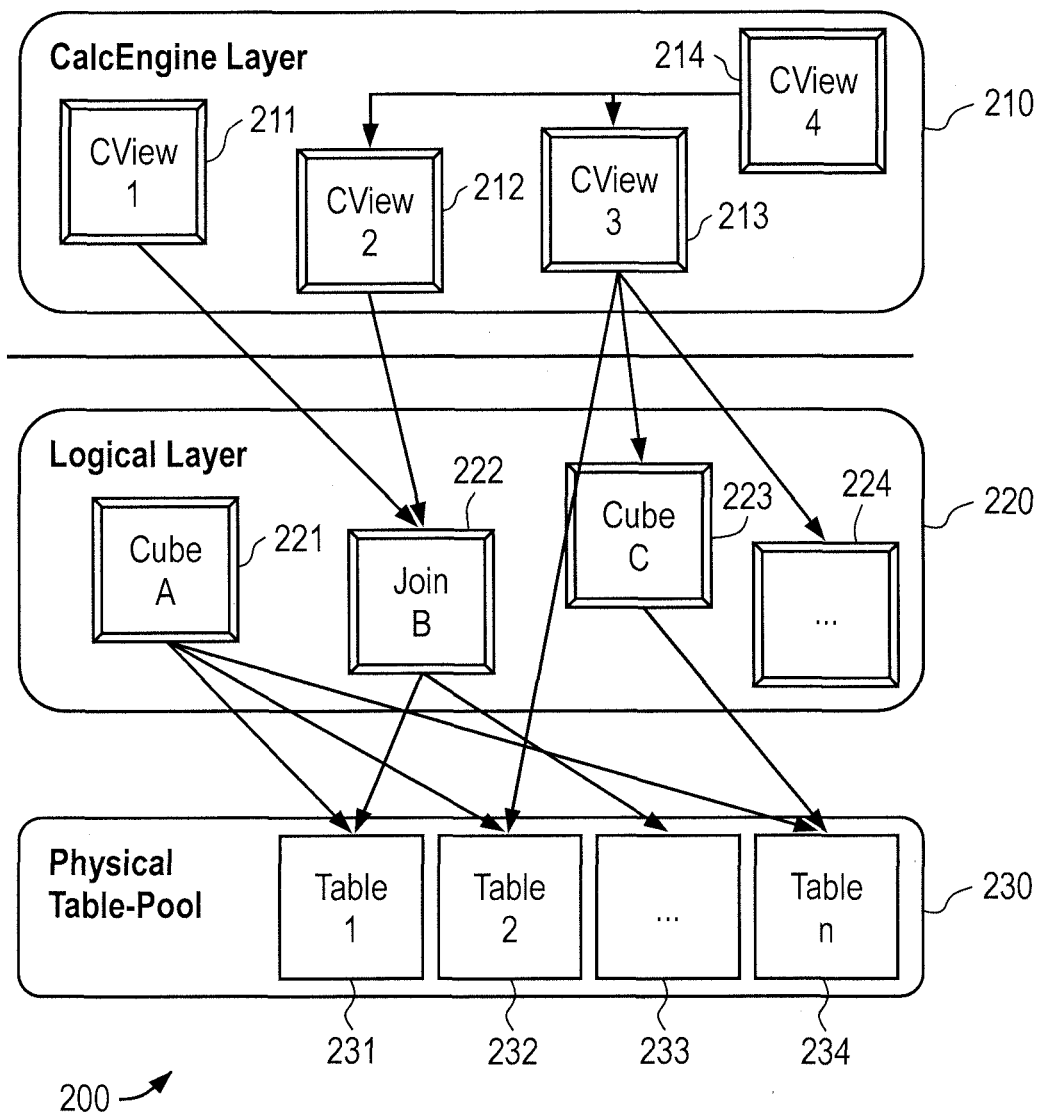
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical meta-models defined by the logical layer 220 to form a new index. For example, the tables in a cube (OLAP index) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP indexes or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Figure 3:
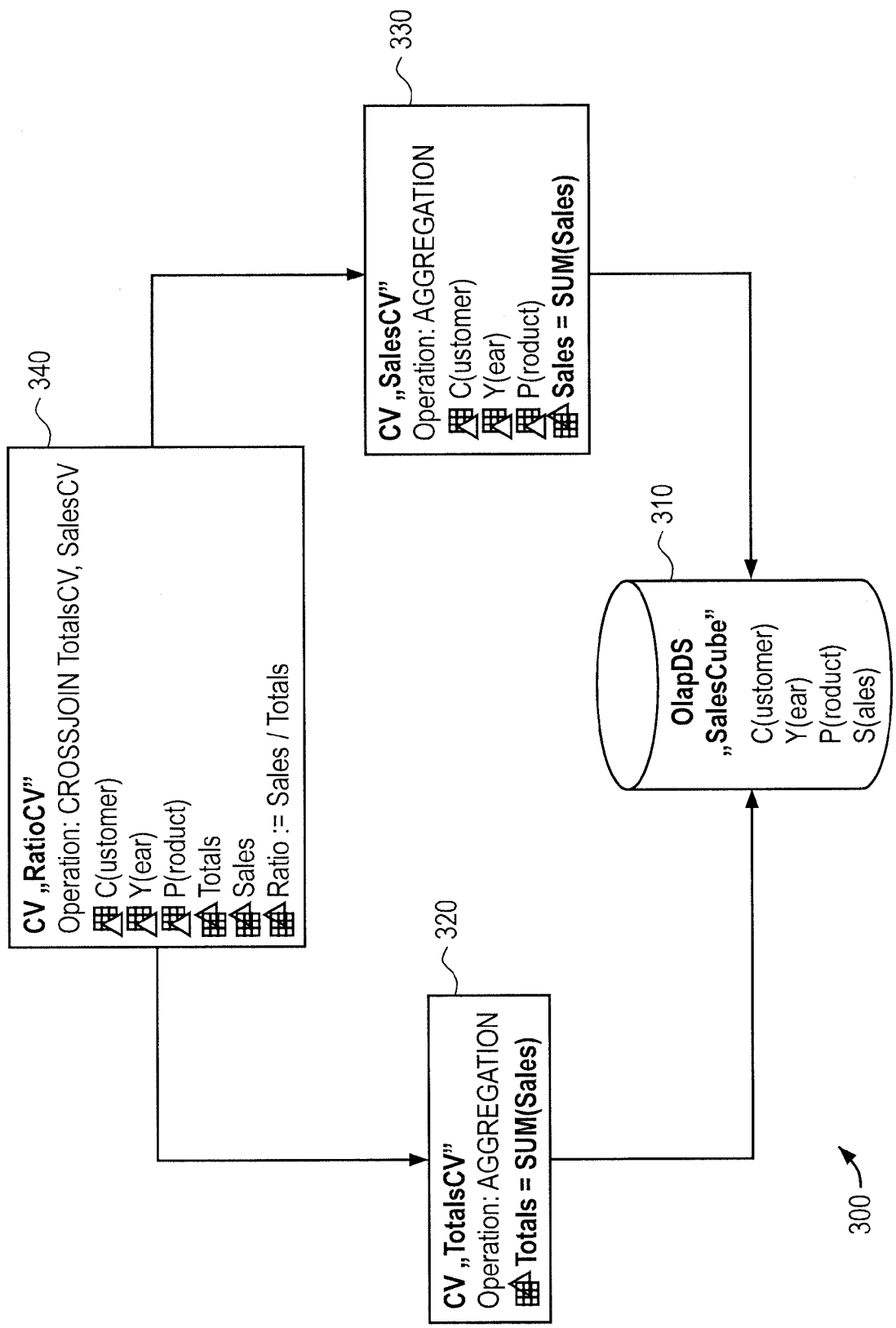
FIG. 3 is a diagram illustrating a first instantiation of a calculation scenario.

FIG. 3 is a diagram 300 illustrating an example of a calculation scenario that relates a number of sales to total sales. With conventional arrangements, such a query can be expressed with several SQL statements but not in a single statement, because for the calculation of the relation two aggregations at different aggregation levels are required. To calculate the number of sales, aggregation is performed by a requested GroupBy attribute. To calculate the sales total, all sales need to be aggregated. Previously this required two separate requests on different SQL view, and the final calculation had to be performed in the application (as opposed to database-side).

For this example, that data source is an OLAP cube "SalesCube" 330, which has the three dimensions Customer, Year, and Product as well as the measure Sales. As stated, this data source 310 can be entered as a special DataSource node in the logical layer 220 in the calculation scenario. The DataSource is now referenced from two calculation nodes. The calculation node TotalsCV 320 on the left side calculates the sales total, by simply summing the sales without any GroupBy attributes. The calculation node SalesCV 330 on the right side calculates the sales according to the GroupBys. To calculate their relationship, the two calculation nodes 320, 330 are joined with each other using a CrossJoin. In the calculation node RatioCV 340 after the join, all the attributes needed for the calculation are available and a new calculated attribute Ratio is provided.

Figure 4:
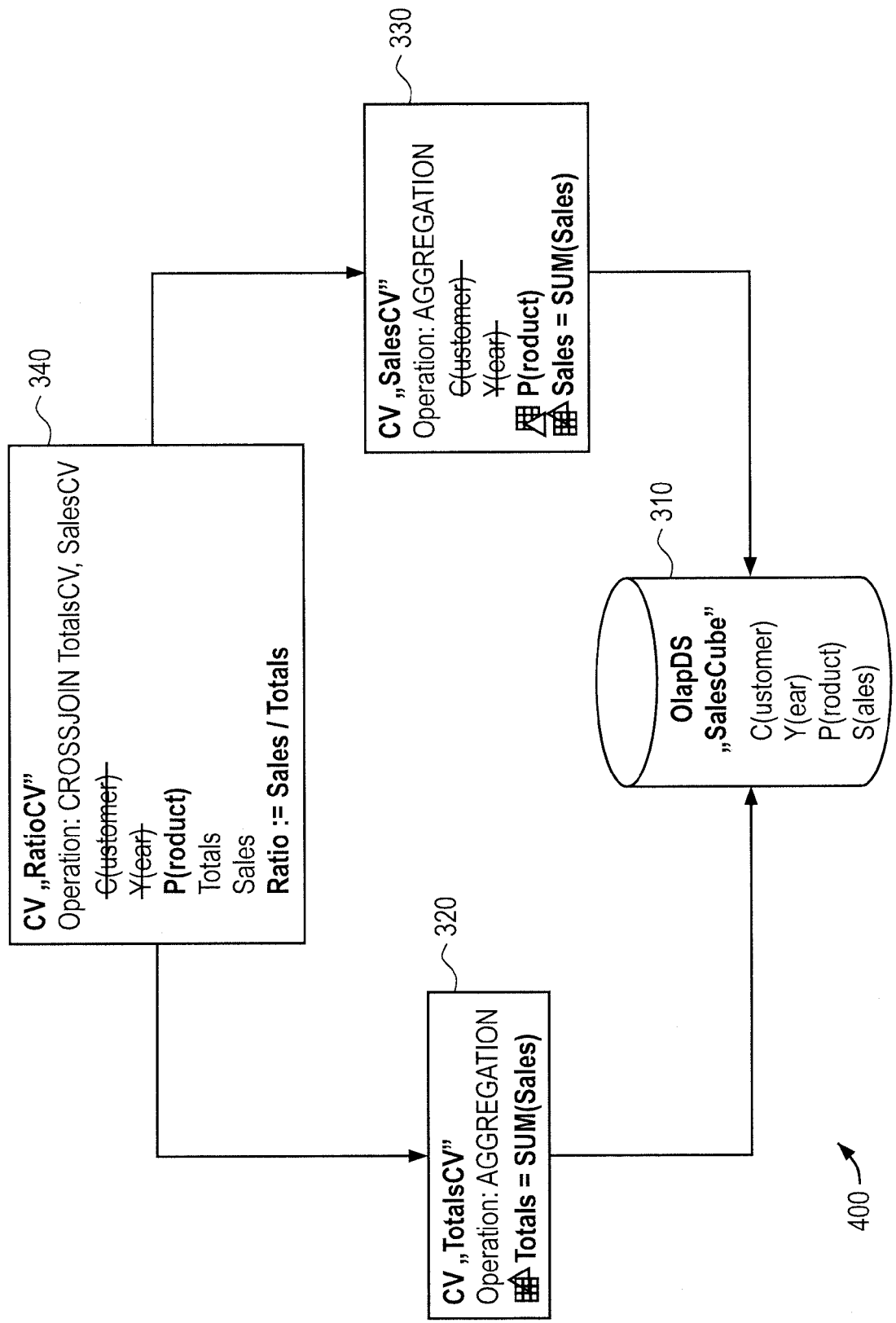
FIG. 4 is a diagram illustrating a second instantiation of a calculation scenario.

The implementation of FIG. 3 is a general calculation scenario. That is, if the calculation scenario is queried via a SQL statement which only requests product as GroupBy attribute, the model is appropriately instantiated and executed. FIG. 4 is a diagram 400 illustrating a variation in which not all of the attributes specified by the calculation nodes 330, 340 are required. In particular, the ratio calculation is for sales relative to total sales without regard to customer and year. In the instantiation, the unnecessary attributes Customer and Year are removed from the calculation nodes RatioCv 340 and SalesCV 330 which accelerates execution of the results (e.g., the ratio) because less data has to be touched (i.e., fewer attributes need to be searched/persisted, etc.).

Figure 5:
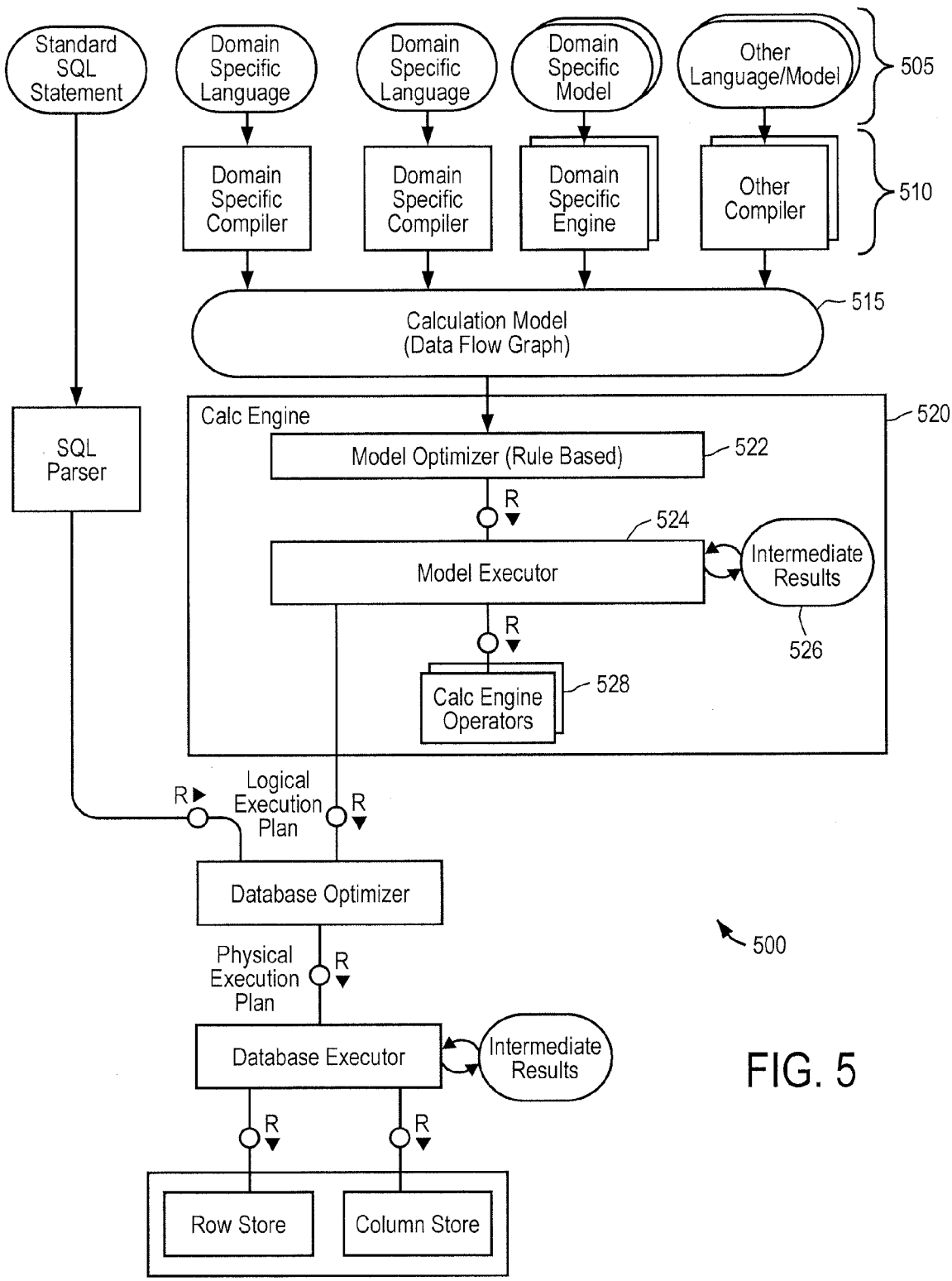
FIG. 5 is a diagram illustrating an architecture for processing and execution control.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 515 (illustrated as a calculation model). To achieve enhanced performance, the models and programs written in these languages are executed inside the database server. This arrangement eliminates the need to transfer large amounts of data between the database server and the client application. Once the different artifacts 505 are compiled into this calculation scenario 515, they can be processed and executed in the same manner. The execution of the calculation scenarios 515 (i.e., calculation scenarios) is the task of a calculation engine 520.

The calculation scenario 515 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "ALTER SYSTEM ADD SCENARIO <xml OR json representing the scenario>". Once a calculation scenario 515 is created, it can be queried (e.g., "SELECT A, B, C FROM <scenario name>", etc.). In some cases, databases can have pre-defined calculation scenarios 515 (default, previously defined by users, etc.). The calculation scenarios 515 can be persisted in a repository (coupled to the database server) or in transient scenarios, the calculation scenarios 515 can be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

Figure 6:
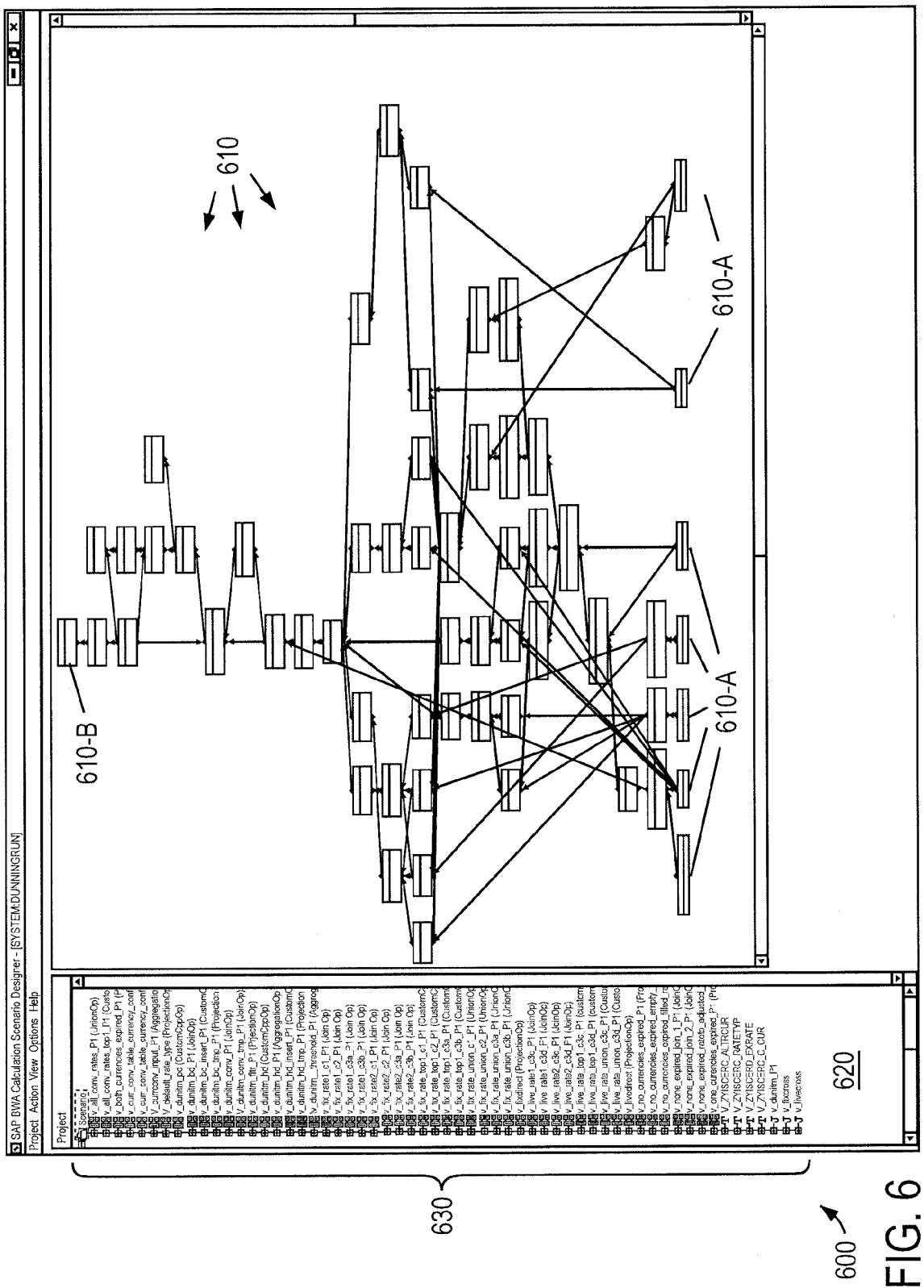
FIG. 6 is a diagram of a graphical user interface illustrating a dunning calculation scenario.

FIG. 6 is a diagram of a modeling tool 600 rendering a complex calculation scenario relating to a dunning run (which is the process of communicating with customers to ensure the collection of accounts receivable). A company triggers the dunning run to identify the customers who have outstanding accounts. To identify these customers a complex application logical must be execute:

Currency: Not all bills are paid in the same currency, so each item must be checked if currency conversion is required and the currency conversion must be applied to transform the item into the local currency of the company.

Balances between both companies need to be compared in order to determine whether there is a surplus or deficit.

The currency conversion must be performed on an item level and afterward the aggregation value must be displayed. As a result, during the run, a lot of data in tables has to be touched and the intermediate results can be quite large The modeling tool 600 illustrates all calculation nodes 610 of the dunning run which are illustrated in a hierarchical arrangement. Text versions of these calculation nodes 610 are displayed as elements 630 in a window 620 within the modeling tool 600. Each of the calculation nodes 610 represents a database operation (join, projection, aggregation, union, etc.). Selection of the graphical user interface elements 630 can cause, for example, information relating to the corresponding database operation to be displayed. All together, the calculation nodes 610 define a data flow starting at bottom at the calculation nodes 610-A and going up to a root node 610-B at the top.

If a single SQL statement for all of these operations were to be created, it would be difficult to understand (from a human perspective) which would make it more prone for human error. In contrast, with the current calculation scenario, one can still see the structure of the data flow model and access each node of the model to display the results.

Figure 7:
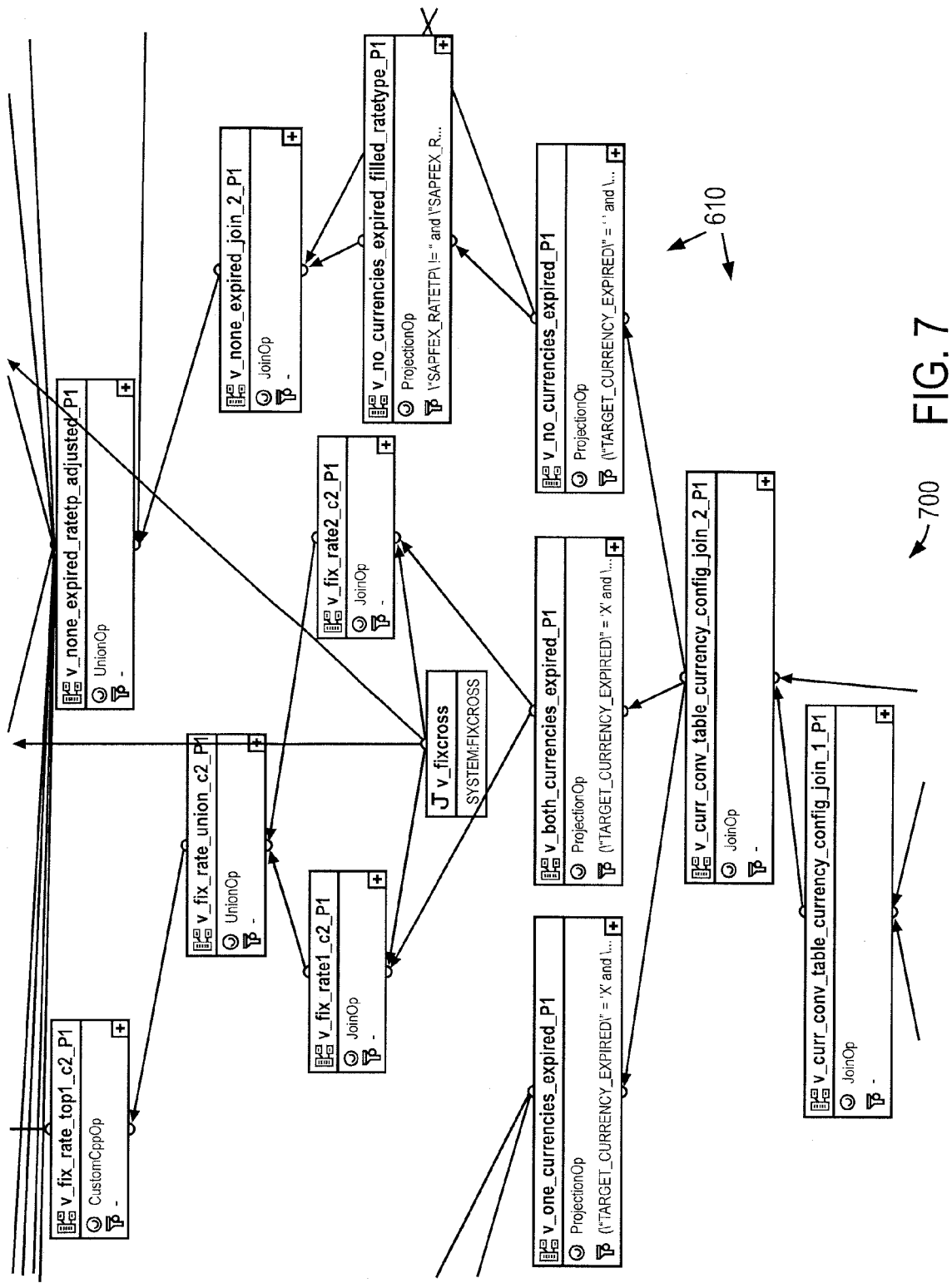
FIG. 7 is a diagram showing a portion of the dunning calculation scenario of FIG. 6.

FIG. 7 is a diagram 700 illustrating a portion of the calculation nodes 610 illustrated in FIG. 6. In particular, this diagram 700 shows a section of the currency conversion in the Dunning Run. As illustrated, one node can be used by two or three other nodes and such nodes execute additional filters to select the required data from the incoming node. These filters handle a typical requirement in the currency conversion process because often a value in a special column defines what type of conversion must be applied to a particular row and then a totally different data flow must be applied. Such operations/filters in SQL would require multiplying the same sub SQL statement for each selection. This requirement can be difficult, if not impossible, to implement.

FIGS. 6 and 7 demonstrate that if a whole dunning scenario is expressed in one SQL statement, the currency conversion would only be useable within that particular scenario. In contrast, with the current subject matter, logic within calculation scenarios can be re-used (which allow for an easier creation of complementary calculation scenarios). For example, with regard to dunning, a report can be generated that lists the suppliers for that the own company has open bills. In such a calculation scenario, currency conversion is also required so the corresponding logic can be added to the calculation scenario such that the calculation nodes 610 that are required for the currency conversion can be re-used.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
    receiving, by a database server from a remote application server, a select query specifying a calculation scenario, the specified calculation scenario being one of a plurality of calculation scenarios and defining a data flow model that includes one or more calculation nodes, each calculation node defining one or more operations to execute on the database server to respond to the query, at least one calculated node defining a calculated attribute;
    instantiating, by the database server, the specified calculation scenario, wherein at least a portion of paths and/or attributes defined by the specified calculation scenario are not required to respond to the query, and instantiating the specified calculation scenario includes omitting the paths and attributes defined by the specified calculation scenario that are not required to respond to the query;
    executing, by the database server, the operations defined by the calculation nodes of the instantiated calculation scenario to result in data set responsive to the query; and
    providing, by the database server to the application server, the data set.

2. A method as in claim 1, wherein at least one of the calculation nodes filters results obtained from the database server.

3. A method as in claim 1, wherein at least one of the calculation nodes sorts results obtained from the database server.

4. A method as in claim 1, wherein the calculation scenario is instantiated in a calculation engine layer by a calculation engine.

5. A method as in claim 4, wherein the calculation engine layer interacts with a physical table pool and a logical layer, the physical table pool comprising physical tables containing data to be queried, and the logical layer defining a logical metamodel joining at least a portion of the physical tables in the physical table pool.

6. A method as in claim 1, wherein an input for each calculation node comprises one or more of: a physical index, a join index, an OLAP index, and another calculation node.

7. A method as in claim 6, wherein each calculation node has at least one output table that is used to generate the final result set.

8. A method as in claim 7, wherein at least one calculation node consumes an output table of another calculation node.

9. A method as in claim 1, wherein the executing comprises:

forwarding the query to a calculation node in the calculation scenario that is identified as a default node if the query does not specify a calculation node at which the query should be executed.

10. A method as in claim 1, wherein the query identifies a particular calculation node, and wherein the executing comprises:
forwarding the query to the calculation node specified in the query at which the query should be executed.

11. A method as in claim 1, wherein the calculation scenario comprises database metadata.

12. A method as in claim 1, wherein the calculation scenario is exposed as a database calculation view.

13. A method as in claim 12, wherein the executing comprises:
invoking, by a SQL processor, a calculation engine to execute the calculation scenario behind the database calculation view.

14. A method as in claim 13, wherein the calculation engine invokes the SQL processor for executing set operations.

15. A method as in claim 14, wherein the SQL processor invokes the calculation engine when executing SQL queries with calculation views.

16. A system comprising:
a database server comprising memory and at least one data processor; and an application server in communication with and remote from the database server comprising memory and at least one data processor;
wherein:
the database server receives, from the application server, a query associated with a calculation scenario, the calculation scenario being one of a plurality of calculation scenarios and defining a data flow model that includes one or more calculation nodes, each calculation node defining one or more operations to execute on the database server to respond to the query, at least one calculated node defining a calculated attribute;
the database server instantiates the calculation scenario, wherein at least a portion of paths and/or attributes defined by the calculation scenario are not required to respond to the query, and instantiating the calculation scenario includes omitting the paths and attributes defined by the calculation scenario that are not required to respond to the query;
the database server executes the operations defined by the calculation nodes of the instantiated calculation scenario to result in a data set responsive to the query;
the database server provides the data set to the application server; and
the calculation scenario being reusable, in whole or in part, across multiple different queries.

17. A system as in claim 16, wherein there are a plurality of application servers coupled to the database server.

18. A system as in claim 16, wherein the database server executes three layers, a calculation engine layer, a logical layer, and a physical table pool.

19. A non-transitory computer program product storing instructions, which when executed by at least one data processor forming part of at least one computing system, result in operations comprising:
receiving data generated by an application server that comprises a query that specifies a calculation scenario, the specified calculation scenario being one of a plurality of calculation scenarios and defining a data flow model that includes one or more calculation nodes, each calculation node defining one or more operations to execute on the database server to respond to the query, at least one calculated node defining a calculated attribute;
instantiating the specified calculation scenario in a calculating engine layer, the calculation engine layer interacting with a physical table pool and a logical layer, the physical table pool comprising physical tables containing data to be queried, and the logical layer defining a logical metamodel joining at least a portion of the physical tables in the physical table pool, wherein at least a portion of paths and/or attributes defined by the specified calculation scenario are not required to respond to the query, and instantiating the specified calculation scenario includes omitting the paths and attributes defined by the specified calculation scenario that are not required to respond to the query;
executing the operations defined by the calculation nodes of the instantiated calculation scenario to result in a data set responsive to the query; and
providing the data set to the application server.

* * * * *